United States Patent
Smiddy et al.

(10) Patent No.: US 11,876,793 B2
(45) Date of Patent: Jan. 16, 2024

(54) SIMULTANEOUS APPLICATION SUPPORT OF MULTIPLE IDENTITY MANAGEMENT SYSTEMS VIA VIRTUAL WEB SERVERS

(71) Applicant: BANK OF AMERICA CORPORATION, Charlotte, NC (US)

(72) Inventors: David Smiddy, Chadds Ford, PA (US); Himanshu Goyal, Fort Mill, SC (US); Raghu Nadimpalli, Weddington, NC (US); Sanath K. Pasumarthy, Charlotte, NC (US); Zeal J. Shah, Cumming, GA (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 127 days.

(21) Appl. No.: 17/401,015

(22) Filed: Aug. 12, 2021

(65) Prior Publication Data
US 2023/0046196 A1 Feb. 16, 2023

(51) Int. Cl.
*H04L 9/40* (2022.01)
*G06F 16/957* (2019.01)
*G06F 16/955* (2019.01)

(52) U.S. Cl.
CPC ...... *H04L 63/0815* (2013.01); *G06F 16/9566* (2019.01); *G06F 16/9574* (2019.01)

(58) Field of Classification Search
None
See application file for complete search history.

(56) References Cited

U.S. PATENT DOCUMENTS

| | | | |
|---|---|---|---|
| 2011/0277027 A1* | 11/2011 | Hayton | G06F 21/554 726/8 |
| 2014/0282889 A1* | 9/2014 | Ishaya | G06F 9/5072 726/4 |
| 2019/0174449 A1* | 6/2019 | Shan | H04W 60/00 |
| 2019/0317786 A1* | 10/2019 | Sun | G06F 9/45558 |
| 2020/0151338 A1* | 5/2020 | Silverstone | H04L 63/20 |
| 2020/0310698 A1* | 10/2020 | Gardner | G06F 3/1261 |
| 2020/0310710 A1* | 10/2020 | Tjong | G06F 3/1287 |

OTHER PUBLICATIONS

Lee et al., "Supporting Virtual Organizations Using Attribute-Based Encryption in Named Data Networking", Oct. 1, 2018, IEEE, 2018 IEEE 4th International Conference on Collaboration and Internet Computing (CIC) (pp. 188-196) (Year: 2018).*

* cited by examiner

*Primary Examiner* — Davoud A Zand
(74) *Attorney, Agent, or Firm* — Moore & Van Allen PLLC; James C. Edwards

(57) ABSTRACT

Simultaneous distributed application support of multiple identity management systems is provided through the use of virtual web server instances, which enable one identity management system, on physical servers already running a pre-existing web server instance, which enables a different identity management system. Further, an intelligent rules-based determination is implemented to determine whether to route an access request to either the virtual or pre-existing web server instance. Since the virtual web server instances are generated on the same physical server that executes the pre-existing web service instance, the the existing network flow (i.e., a single URL) and physical infrastructure is leveraged to create a simplified approach to managing the simultaneous use of multiple identity management systems across different distributed applications.

16 Claims, 5 Drawing Sheets

SIMULTANEOUS APPLICATION SUPPORT OF MULTIPLE IDENTITY MANAGEMENT SYSTEMS VIA VIRTUAL WEB SERVERS

FIELD OF THE INVENTION

The present invention is generally directed to computer network security and, more specifically, managing the use of at least two different identity management systems simultaneously across multiple distributed applications through the use of virtual web servers and intelligent rules-based routing of single sign-on access requests.

BACKGROUND

In many enterprises, distributed applications rely on identity management solutions/systems so that users who navigate from one of the applications to another are not required to repeatedly login (i.e., provide login credentials, such as username/passcode, biometrics, or the like). This so-called signal sign-on (SSO) means that a user provides their credentials at an initially accessed application and as the user navigates to other applications, the other applications are able to recognize the user without requiring the user to sign-on (i.e., provide their credentials).

However, distributed applications are only able to support, at any point in time, one type of identity management system. This becomes problematic when an enterprise has a desire to change from one identity management system to another identity management system. Specifically, since an enterprise has a large volume of distributed applications the migration from one identity management system to another identity management system occurs over a prolonged period of time, during which some of the distributed systems rely on the identity management system being replaced and some of the distributed systems rely on the new identity management system. A problem arises in a highly distributed connected world, in which one distributed application relies on the identity management system being replaced, while at least some of the upstream distributed applications have already undergone migration to the new identity management system. Unless a solution is in place to address this scenario, the user who navigates from one distributed application to another may not be afforded the efficiencies of single sign-on (i.e., may be required to logon when accessing upstream applications).

While solutions do exist for addressing simultaneous use of multiple identity management system, such as using separate Universal Resource Locators (URLs) and/or separate physical infrastructures, these solutions tend to be cost prohibitive. Therefore, a need exists to develop systems, methods, computer program products and the like that are capable of intelligently supporting multiple identity management systems simultaneously across enterprise-wide distributed applications. The desired systems, methods, computer program products and the like should use existing network flows and infrastructures, so as to provide a simplified and cost-effective approach to managing the instances in which a enterprise desires to use multiple identity management systems (e.g., when migrating from one identity management system to another identity management system or the like)

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing the capability to intelligently support the simultaneous use of multiple identity management systems (i.e., multiple Single Sign-On (SSO) systems) through the use of virtual web servers and a rules-based determination of which web server instance (virtual or otherwise) to delegate an access request to.

Specifically, the present invention generates one or more virtual web server instances into a physical server that includes a pre-existing web service instance (i.e., non-virtual instance). The virtual web server instance(s) enables one identity management system, while the pre-existing web server instance enables another identity management system. As such, the present invention relies on the existing network flow (i.e., a single URL) and physical infrastructure and, therefore, provides for a simplistic and cost-effective approach to simultaneous use of multiple identity management systems across different distributed applications.

Moreover, the present invention relies on intelligent rules-based decisioning to determine which access requests are delegated to which identity management system/agent (i.e., the pre-existing web server instance or the virtual web server instance). In specific embodiments of the present invention, the rules-based determination requires analyzing the access request coming from an originating distributed application to determine, based on the contents of the access request, which identity management system the originating distributed application supports. For example, specific identity management systems rely on the transmission of authentication tokens as a means of propagating the user's authentication credentials from one distributed application to another. In such instances, a local traffic management gateway device or the like intelligently implementing the rules-based decisioning analyzes the access request for the presence of an authentication token and routes the access request to the pre-existing web server instance or the virtual web server instance based on which of the web server instances enables the identity management system that relies on authentication tokens.

In additional embodiments of the present invention, health/capability checks may be administered on the virtual web server instances prior to routing an access request to the virtual web server instance. In such embodiments of the present invention, in response to determining that the virtual web instance is unhealthy/incapable of processing the request, the request is routed to the pre-existing web server instance.

A system for managing multiple identity management systems across a plurality of distributed applications defines first embodiments of the invention. The system includes a plurality of distributed applications, each distributed application configured to support either (i) a first identity management system, or (ii) a second identity management system. In addition, the system includes one or more servers, each server including a web server instance configured to enable the first identity management system within one or more of the distributed applications and at least one virtual web server instance configured to enable the second identity management system within the one or more of the distributed applications.

The system further includes a computing platform, such as a gateway device or the like, including a memory and at least one processing device in communication with the memory. The memory stores instructions that are executable by the at least one processing device. The instructions are configured to receive a request, originating from a first one of the plurality of distributed applications, to access a second one of the plurality of distributed applications. In response to receiving the request, the instructions are further configured to intelligently implement a first set of rules to determine to route the request, within one of the one or more servers, to either (i) the web server instance enabling the first identity management system, or (ii) one of the at least one virtual web server instances enabling the second identity management system.

In specific embodiments of the system, the first and second identity management systems are configured to allow for users to access the plurality of distributed applications while only providing login credentials at an initially accessed one of the plurality of distributed applications.

In other specific embodiments of the system, the instructions configured to intelligently implement the first set of rules are further configured to analyze the request to determine a presence of a authentication token and route the request to either (i) the web server instance, or (ii) the one of the at least one virtual web server instances based on the presence or a lack of presence of the authentication token. In specific related embodiments of the system, the instructions configured to intelligently implement the first set of rules to analyze the request to determine a presence of a authentication token and route the request to (ii) the one of the at least one virtual web server instances based on the presence the authentication token.

In additional specific embodiments of the system, the instructions are further configured to, in response to determining to route the request to (ii) the one of the at least one virtual server instances, determine a capability of the one of the at least one virtual servers instances to enable the second identity management system within the second one of the distributed applications. In related specific embodiments of the system, the instructions are further configured to, in response to determining that the one of the at least one virtual instances is incapable of enabling the second identity management system within the second one of the distributed applications, route the request to (i) the web server instance enabling the first identity management system.

Moreover, in additional specific embodiments of the system, the instructions are further configured to intelligently implement a second set of rules to determine the one of the one or more servers to route the request to. In specific related embodiments, the instructions configured to intelligently implement the second set of rules to determine the one of the one or more servers to route the request to are further configured to determine the one of the one or more servers based on current processing loads at the one or more servers.

A computer-implemented method for managing multiple identity management systems across a plurality of distributed applications defines second embodiments of the invention. The method is executable by one or more processing devices. The method includes generating, within one or more servers having a web server instance configured to enable a first identity management system within one or more of a plurality of distributed applications, at least one virtual web server instance configured to enable a second identity management system within the one or more of the plurality of distributed applications. The method further includes receiving a request, originating from a first one of the plurality of distributed applications, to access a second one of the plurality of distributed applications. In addition, the method includes in response to receiving the request, intelligently implementing a first set of rules to determine to route the request, within one of the one or more servers, to either (i) the web server instance enabling the first identity management system, or (ii) one of the at least one virtual web server instances enabling the second identity management system.

In specific embodiments of the computer-implemented method, receiving the request further includes receiving the request that is configured to allow a user to access the second one of the plurality distribution applications absent the user providing login credentials.

In other specific embodiments of the computer-implemented method, intelligently implementing the first set of rules further includes analyzing the request to determine a presence of a authentication token and route the request to either (i) the web server instance, or (ii) the one of the at least one virtual web server instances based on the presence or a lack of presence of the authentication token.

In additional specific embodiments, the computer-implemented method further includes, in response to determining to route the request to (ii) the one of the at least one virtual server instances, determining a capability of the one of the at least one virtual servers instances to enable the second identity management system within the second one of the distributed applications. In related specific embodiments, the computer-implemented method further includes, in response to determining that the one of the at least one virtual instances is incapable of enabling the second identity management system within the second one of the distributed applications, routing the request to (i) the web server instance enabling the first identity management system.

In still further specific embodiments, the computer-implemented method includes intelligently implementing a second set of rules to determine the one of the one or more servers to route the request to based on current processing loads at the one or more servers.

A computer program product including a non-transitory computer-readable medium defines third embodiments of the invention. The non-transitory computer-readable medium includes a first set of codes for causing a computer to generate, within one or more servers having a web server instance configured to enable a first identity management system within one or more of a plurality of distributed applications, at least one virtual web server instance configured to enable a second identity management system within the one or more of the plurality of distributed applications. In addition, the computer-readable medium includes a second set of codes for causing a computer to receive a request, originating from a first one of the plurality of distributed applications, to access a second one of the plurality of distributed applications. Additionally, the computer-readable medium includes a third set of codes for causing a computer to, in response to receiving the request, intelligently implement a first set of rules to determine to route the request, within one of the one or more servers, to either (i) the web server instance enabling the first identity management system, or (ii) one of the at least one virtual web server instances enabling the second identity management system.

In specific embodiments of the computer program product, the second set of codes are further configured to cause the computer to receive the request that is configured to allow a user to access the second one of the plurality distribution applications absent the user providing login credentials.

In further specific embodiments of the computer program product, the third set of codes is further configured to cause the computer to intelligently implement the first set of rules to analyze the request to determine a presence of a authentication token and route the request to either (i) the web server instance, or (ii) the one of the at least one virtual web server instances based on the presence or a lack of presence of the authentication token.

In additional specific embodiments of the computer program product, the computer-readable medium additionally includes a fourth set of codes for causing a computer to, in response to determining to route the request to (ii) the one of the at least one virtual server instances, determine a capability of the one of the at least one virtual servers instances to enable the second identity management system within the second one of the distributed applications. In related embodiments of the computer program product, the computer-readable medium includes a fifth set of codes for causing a computer to, in response to determining that the one of the at least one virtual instances is incapable of enabling the second identity management system within the second one of the distributed applications, route the request to (i) the web server instance enabling the first identity management system.

Moreover, in additional specific embodiments of the computer program product, the computer-readable medium additionally includes a fourth set of codes for causing a computer to intelligently implement a second set of rules to determine the one of the one or more servers to route the request to based on current processing loads at the one or more servers.

Thus, according to embodiments of the invention, which will be discussed in greater detail below, the present invention addresses needs and/or achieves other advantages by intelligently supporting the simultaneous use of multiple identity management systems through the use of virtual web servers and a rules-based determination of which web server instance (virtual or pre-existing) to delegate an access request to. Since the virtual web server instances are generated on the same physical server that executes the pre-existing web service instance, the present invention is able to rely on the existing network flow (i.e., a single URL) and physical infrastructure and, therefore, provides for a simplistic and cost-effective approach to simultaneous use of multiple identity management systems across different distributed applications.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
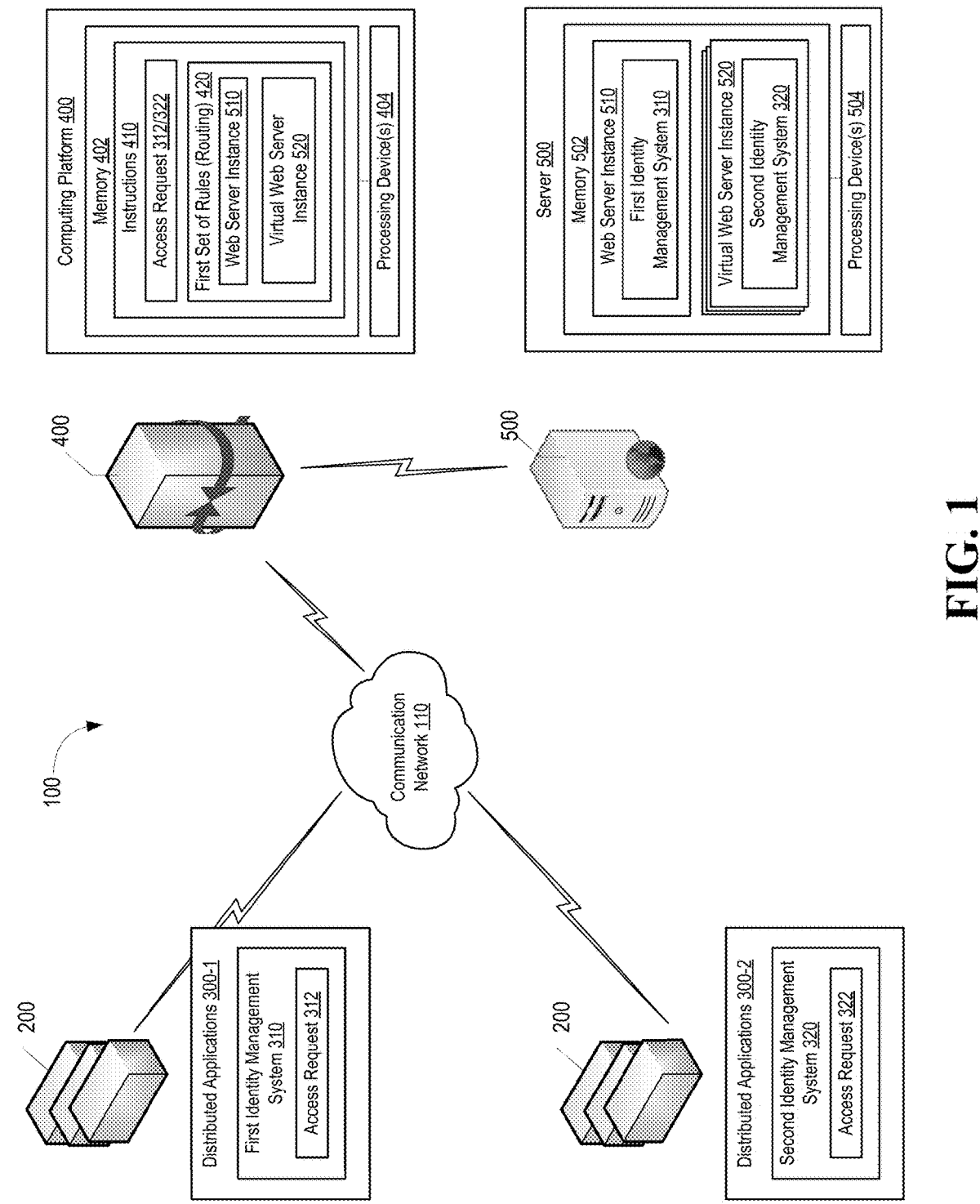
Figure 2:
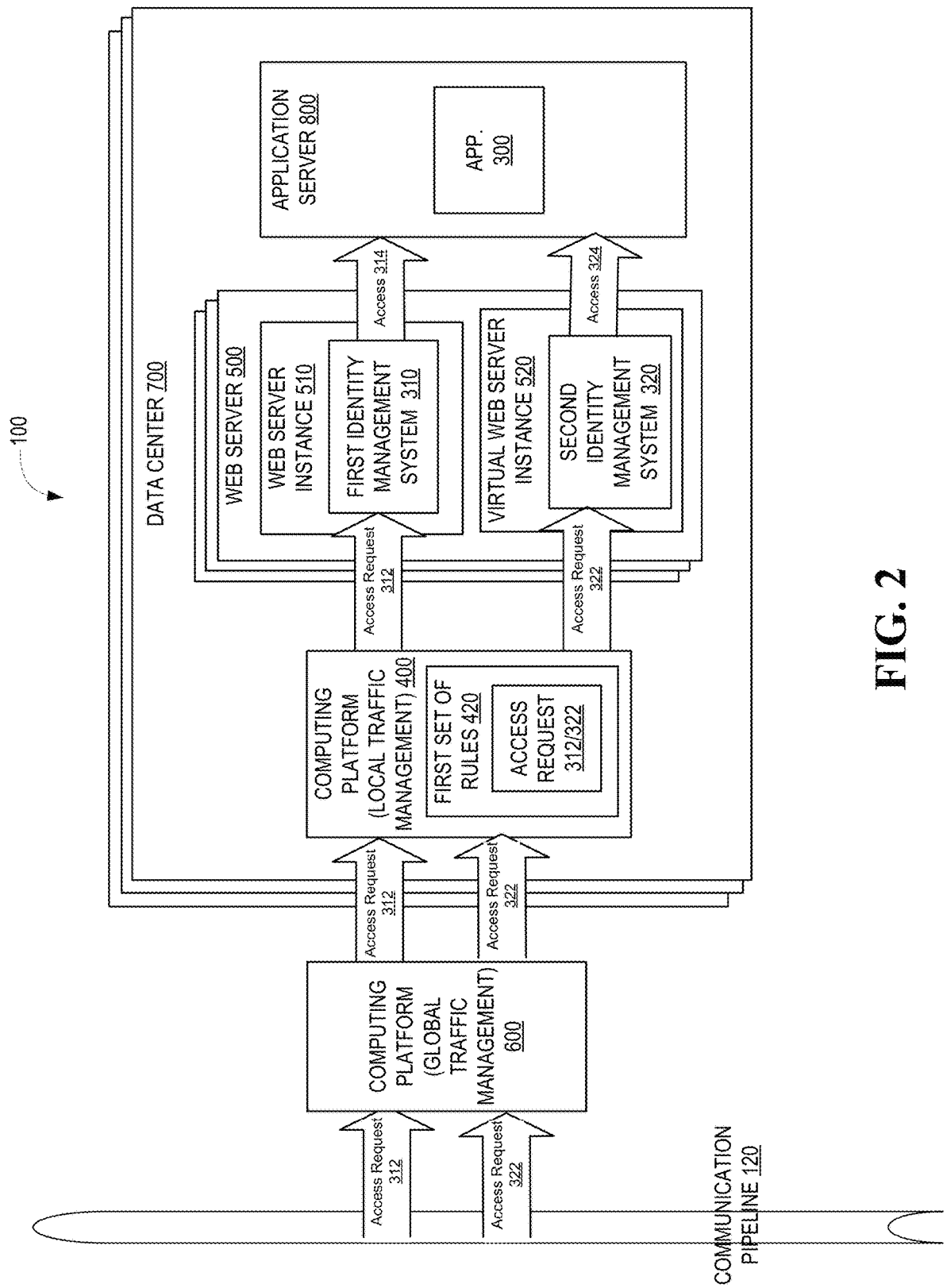
Figure 3:
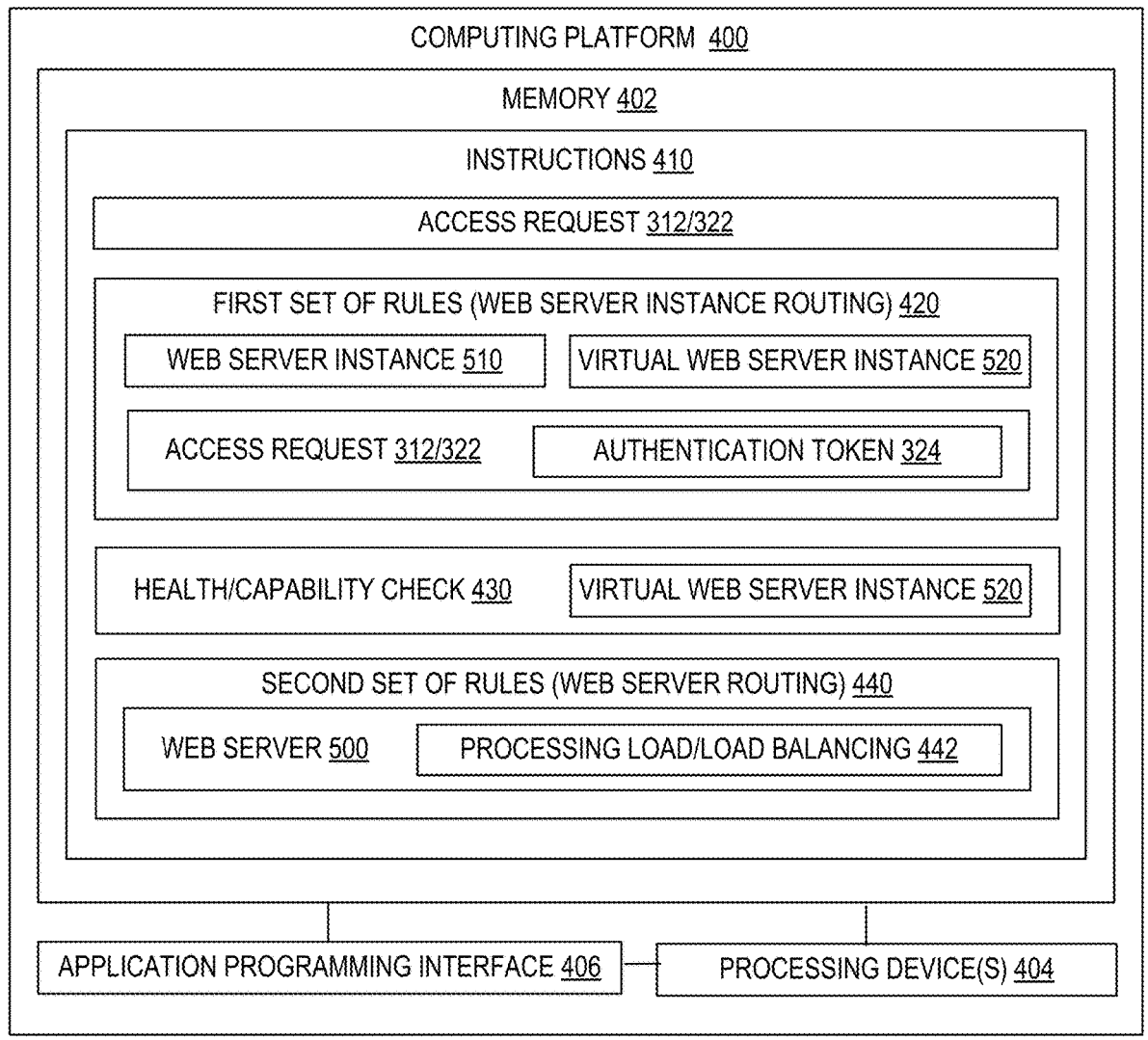
Figure 4:
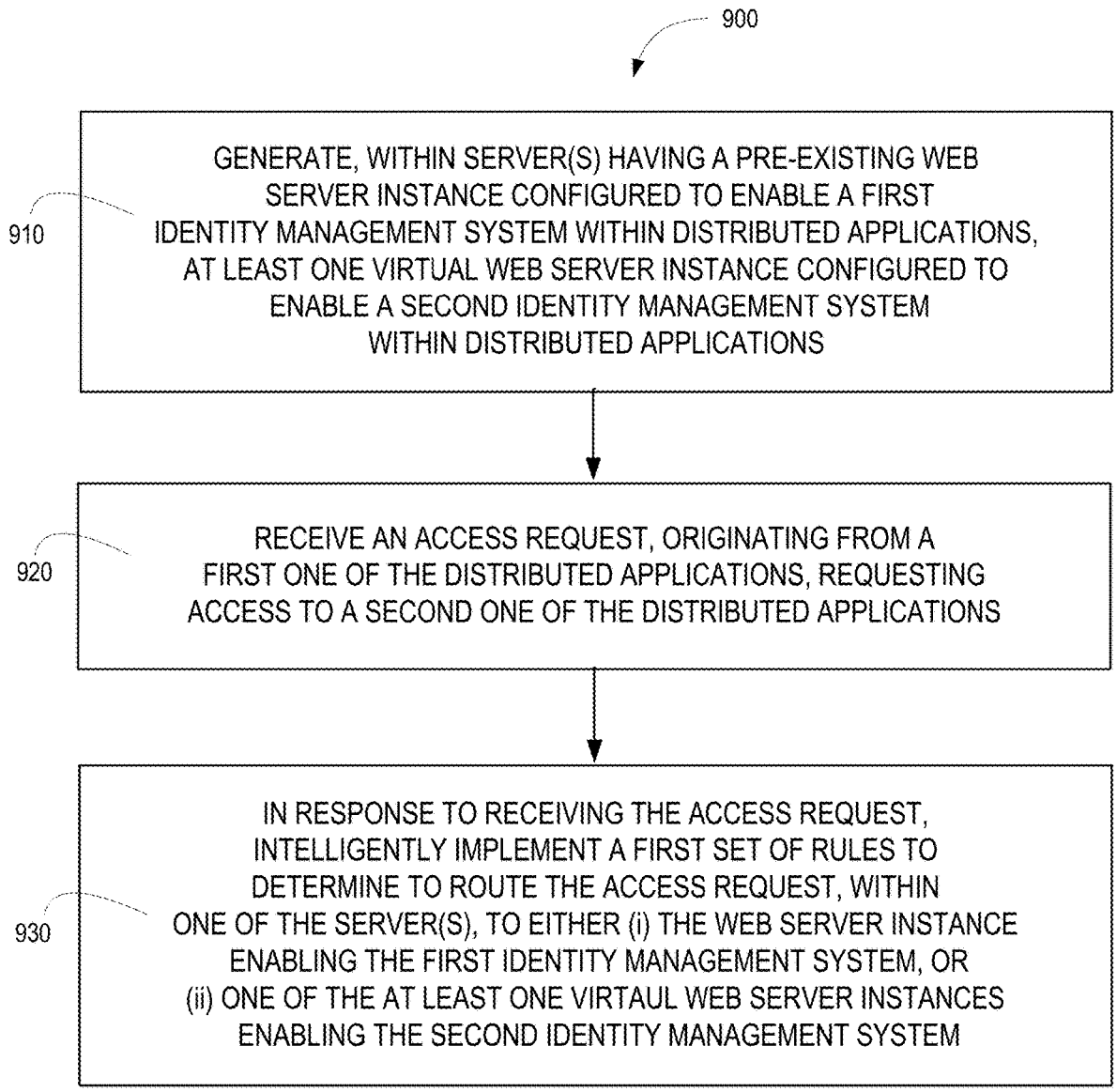
Figure 5:
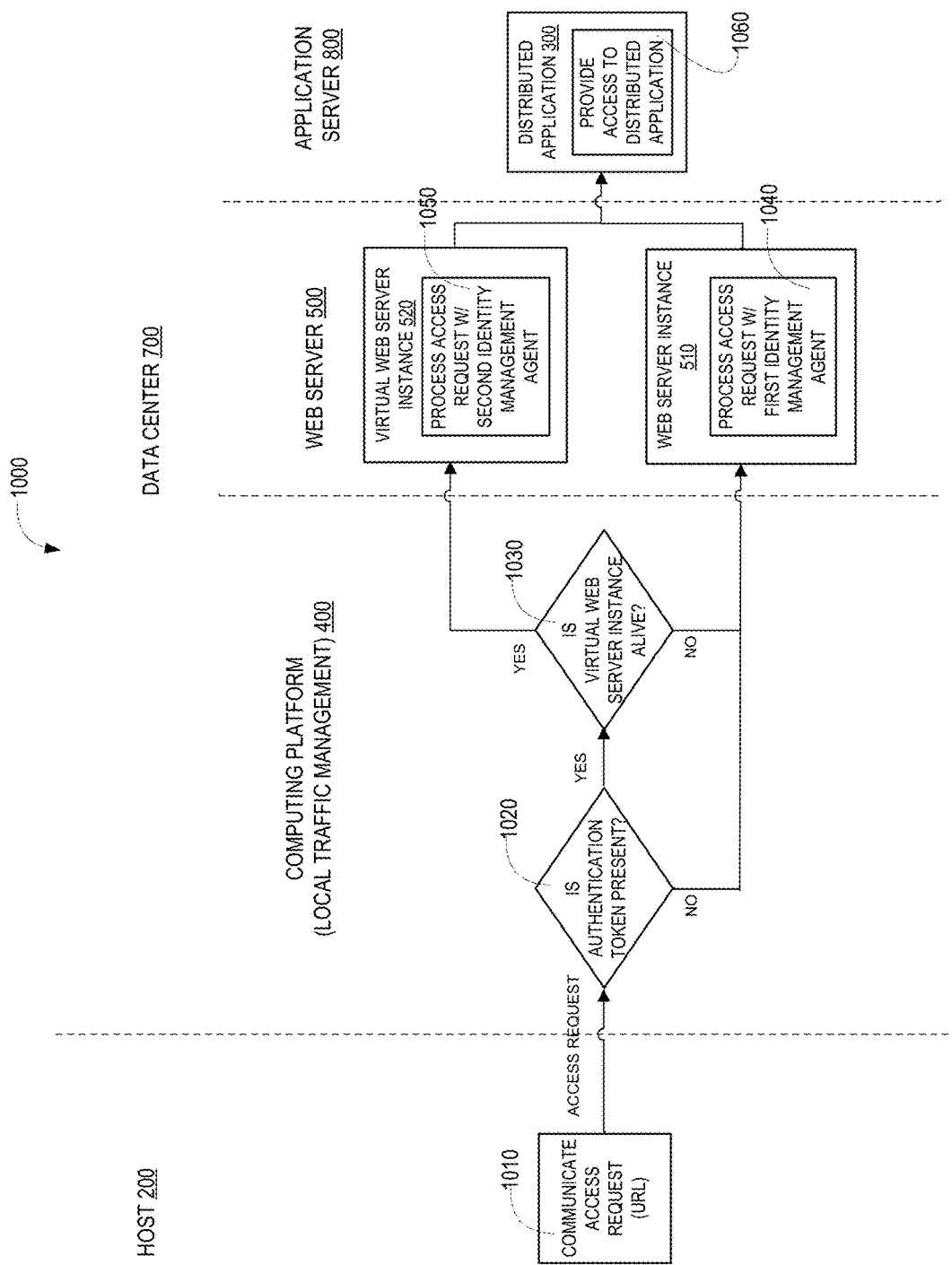

Having thus described embodiments of the disclosure in general terms, reference will now be made to the accompanying drawings, wherein:

FIG. 1 is a schematic/block diagram of a system for managing the use of multiple identity management systems across distributed applications via virtual web server instances and intelligent rules-based decisioning, in accordance with embodiments of the present invention;

FIG. 2 is a block diagram of a system for managing the use of multiple identity management systems across distributed applications via virtual web server instances and intelligent rules-based decisioning, in accordance with embodiments of the present invention;

FIG. 3 is a block diagram of a computing platform, such as a local traffic management gateway device, for decisioning access requests, in accordance with alternate embodiments of the present invention;

FIG. 4 is a flow diagram of a method for managing the use of multiple identity management systems across distributed applications via virtual web server instances and intelligent rules-based decisioning, in accordance with embodiments of the present invention; and FIG. 5 is a flow diagram of a method for managing the use of multiple identity management systems across distributed applications via virtual web server instances and intelligent rules-based decisioning, in accordance with alternate embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that providing for managing simultaneous use of multiple identity management systems (i.e., multiple Single Sign-On (SSO) systems) through the use of virtual web servers and an intelligent rules-based decisioning process of which web server instance (virtual or otherwise) to assign to the access request.

As previously discussed, in large enterprises migration from one identity management system to another occurs over a prolonged period of time. However, distributed applications can only support one identity management system at a time. Thus, problems arise during the migration period when some of the distributed applications support the legacy identity management system and some support the new identity management system. Specifically, when upstream applications supports a different identity management system than the initial application at which the user signed-on (i.e., provide identity credentials) it may not be possible for the authentication credentials to propagate due to inability of the applications to support both identity management systems. The present invention addresses this concern without having to implement multiple network flows (e.g., multiple URLs or the like) or multiple infrastructures. As a result, the present invention provides for a simplified and cost-effective approach.

Specifically, the present invention generates one or more virtual web server instances at a physical server that includes a pre-existing web service instance (i.e., non-virtual instance). The virtual web server instance(s) enables one identity management system, while the pre-existing web server instance enables another identity management system. Additionally, the present invention relies on intelligent rules-based decisioning as to which access requests are delegated to the which identity management system/agent. In specific embodiments of the present invention, the rules-based determination requires analyzing the access request coming from an originating distributed application to determine, based on the contents on the access request, which identity management system the originating distributed application supports. For example, specific identity management systems rely on the transmission of authentication tokens as a means of propagating the user's authentication credentials from one distributed application to another. In such instances, a local traffic management gateway device or the like intelligently implementing the rules-based decisioning analyzes the access request for the presence of an authentication token and routes the access request to either the pre-existing web server instance or the virtual web server instance based on which of the web server instances enables the identity management system that relies on authentication tokens.

In additional embodiments of the present invention, health/capability checks may be administered on the virtual web server instances prior to routing an access request to the virtual web server instance. In such embodiments of the present invention, in response to determining that the virtual web instance is unhealthy/incapable of processing the request, the request is routed to the pre-existing web server instance.

Referring to FIG. 1, a schematic/block diagram is presented of an exemplary system 100 for managing the simultaneous use of multiple identity management systems in different distributed applications, in accordance with embodiments of the present invention. The system 100 is implemented across a distributed communication network 110, which may include the Intranet, one or more intranets, one or more cellular networks or the like. As depicted, the system 100 includes a plurality of distributed applications 300, which are accessible via hosts 200. Each of the distributed applications 300 are configured to support either (i) a first identity management system 310 or (ii) a second identity management system 320. For example, as depicted distributed applications 300-1 support first identity management systems 310 and distributed applications 300-2 support second identity management systems 320. It should be noted that in instances in which an enterprise or the like is migrating from the first identity management system 310 to the second identity management system 320, the distributed applications 300 that support either the first identity management system 310 or the second identity management system 320 will change over time (up until a point in time in which all of the distributed applications 300 support the second identity management system 320).

As previously discussed, identity management systems provide for Single Sign-On (SSO), in which a user provides their credentials at an initial one of the distributed applications and as the user navigates to other upstream/connected distributed applications their credentials are passed along to the other distributed applications, so as to eliminate the need for the user to re-authenticate.

System 100 additionally includes one or more servers 500 having a memory 502 and at least one processing device 504 in communication with the memory 502. The memory 502 stores a web server instance 510 that is configured to enable the first identity management system 310 within the distributed and at least one virtual web server instance 520 that is configured to enable the second identity management system 320. In specific embodiments of the invention, in which the server 500 supports multiple virtual web server instances 520, the additional virtual web server instances 520 may be configured to enable the second identity management system 320 within the distributed applications 300 or may be configured to enable one or more other identity management systems.

The system 100 additionally includes a computing platform 400 that is in network communication with the hosts 200, via communication network 110 and in direct communication with the one or more servers 500. In this regard, the computing platform 400, which may comprise a local traffic management gateway/router device or the like, may be physically located at the same data center or other facility as the server(s) 500. The computing platform 400 includes a memory 402 and at least one processing device 404 in communication with the memory 402. The memory 402 stores instructions 410 that are configured to receive access requests 312 from the hosts 200 requesting access to a distributed application 300. In response to receiving the access request 300, instructions 410 are further configured to intelligently implement a first set of rules 420 (i.e., routing decisioning rules) to determine to route the access request 312/322, within one of the servers 500, to either (i) the web server instance 510 enabling the first identity management system 310, or (ii) the virtual web server instance 520 enabling the second identity management system 320.

Once the routing of the access request 312/322 has been decisioned and routed to the applicable web server instance 510 or 520, the web server instance 510 or 520 provides the application with the requisite user authentication credentials to thereby forego the need for the user to re-authenticate as a means for gaining access to the upstream distributed application.

Referring to FIG. 2, a block diagram is presented of an exemplary system 100 for managing the simultaneous use of multiple identity management systems in different distributed applications, in accordance with embodiments of the present invention, in accordance with embodiments of the present invention. The system 100 of FIG. 2 highlights various alternate embodiments of the invention not shown or described in relation to FIG. 1.

According to the system 100 shown in FIG. 2, access requests 312 and 322 are communicated via communication pipeline 120 and received at computing platform 600, such as a global traffic management apparatus or the like. The access requests originate from hosts 200 (shown in FIG. 1) that are executing either a distributed application 300-1 configured to support the first identity management system 310 or a distributed application 300-2 configured to support the second identity management system 320. For example, the distributed applications may include one or more embedded hyper-links, which, upon user activation, prompt communication of the access request 312/322 to the URL associated with the connected distributed application 300. Computing platform 600 is configured to route the access request 312/322 to one of the plurality of data centers 700 configured to support the requested distributed application 300. In this regard, computing platform 600 is configured to implement load balancing to determine which data center 700 to route the access request 213/322.

Computing platform 400, such as a local traffic management apparatus or the like, receives the access requests 312/322 from computing platform 400 and, as discussed in relation to FIG. 1, invokes a first set of rules 420 to determine whether to route the access request 312/322 to either (i) the pre-existing web server instance 510 configured to enable the first identity management system 310 in the distributed application 300 or (ii) one of the virtual web server instance 520 configured to enable the second identity management system 320, both of which are installed in one physical web server 500. In response to receiving the access requests 312/322, the web server instances 510/520 are configured to process the access requests 312/322 and grant access 314/324 to the distributed application 300 residing in application server 800. Those of ordinary skill in the art will appreciate that processing the access requests includes configuring access to resources within the distributed application in accordance with a user's specific access credentials and the like.

Referring to FIG. 3, a block diagram is depicted of computing platform 400, such as local traffic management gateway/router or the like, in accordance with embodiments of the present invention. In addition to providing greater detail, FIG. 3 highlights various alternate embodiments of the invention. Computing platform 400 comprises one or more computing devices/apparatus, such as routers, gateways or the like configured to execute software programs, including instructions, engines, algorithms, modules, routines, applications, tools, and the like. Computing platform 400 includes memory 402, which may comprise volatile and non-volatile memory, EPROM, EEPROM, flash cards, or any memory common to computer platforms. Moreover, memory 402 may comprise cloud storage, such as provided by a cloud storage service and/or a cloud connection service.

Further, computing platform 400 also includes processing device(s) 404, which may be an application-specific integrated circuit ("ASIC"), or other chipset, logic circuit, or other data processing device. Processing device 404 may execute an application programming interface ("API") 406 that interfaces with any resident programs, such as instructions 410 and algorithms, sub-engines/routines associated therewith or the like stored in the memory 402 of the computing platform 400.

Processing device(s) 404 may include various processing subsystems (not shown in FIG. 3) embodied in hardware, firmware, software, and combinations thereof, that enable the functionality of computing platform 400 and the operability of computing platform 400 on a distributed communication network 110 (shown in FIG. 1). For example, processing subsystems allow for initiating and maintaining communications and exchanging data with other networked devices. For the disclosed aspects, processing subsystems of processing device 404 may include any subsystem used in conjunction with instructions 410 and related engines, routines, algorithms, sub-algorithms, modules, sub-modules thereof.

Computing platform 400 additionally includes a communications module (not shown in FIG. 3) embodied in hardware, firmware, software, and combinations thereof, that enables electronic communications between computing platform 400 and other networks and/or networked devices, such as, hosts 200, server(s) 500 and the like. Thus, the communication module may include the requisite hardware, firmware, software and/or combinations thereof for establishing and maintaining a network communication connection with one or more systems, platforms, networks, or the like.

As previously discussed in relation to FIG. 1, memory 402 stores instructions 410 that are executable by the processing device(s) 404 and configured to receive access requests 312/322 from distributed applications 300 that support either, but not both of, the first identity management system 310 or the second identity management system 320. The access request requests access to another upstream connected distributed application 300. Since the distributed application enable an identity management system, the expectation is that the user requesting the access will not be required to provide authentication credentials in order access the upstream/connected distributed application 300.

In those embodiments of the invention in which the data center or the like comprises multiple web servers 500, each with a pre-existing web server instance 510 enabling the first identity management system 310 and one or more virtual web server instances 520 enabling the second identity management system 320, the instructions 410 may be configured to implement a second set of rules 440 for intelligently determining which of the web servers 500 to route the access request 312/322. In specific embodiments of the invention, the second set of rules 440 determines web server 500 routing based on current processing loads (i.e., load balancing) 442 at the web servers 500.

Instructions 410 are further configured to implement the first set of rules 420 to intelligently determining routing for the access request 312/322. Specifically, the first set of rules 420 are configured to determine whether to route the access request 312/322 to either the (i) the web server instance 510 enabling the first identity management system 310, or (ii) the virtual web server instance 520 enabling the second identity management system 320. In specific embodiments of the invention, the first set of rules 420 are configured to analyze to access request 312/322, specifically the header of the access request 312/322, to determine whether the access request includes an authentication token 324. Certain types of identity management systems will rely on authentication tokens as a means for propagating authentication credentials from one distributed application to another, while other types of identity management systems will rely one other means for propagating authentication credentials from one distributed application to another such as cookies (i.e., text files) or the like.

In such embodiments of the invention, the presence, or lack or presence, of the authentication token 324 determines whether to route the access request 312/322 either the (i) the web server instance 510 enabling the first identity management system 310, or (ii) the virtual web server instance 520 enabling the second identity management system 320. In specific embodiments of the invention, the presence of the authentication token 324 in the access request 312/322 routes the access request 312/322 to the virtual web server instance 520 enabling the second identity management system 320.

In other specific embodiments of the invention, in response to determining that the access request 312/322 is to be routed to the virtual web server instance 520, instructions 410 are configured to perform a health/capability check 430 on the virtual web server instance 520 to make sure that the virtual web server instance is "alive" (i.e., capable of process the access request). In the event that the health/capability check 430 results in a determination that the virtual web server instance is not "alive", the access request 312/322 may be routed to the pre-existing web server instance 510 or, if applicable another virtual web server instance that enables the second identity management system and is determined to be "alive".

Referring to FIG. 4, a flow diagram is depicted of a method 900 for managing the simultaneous use of multiple identity management systems in different distributed applications, in accordance with embodiments of the present invention. At Event 910, at least one virtual web server instance that is configured to enable a second identity management system within the distributed applications is generated within one or more physical servers that have a pre-existing web server instance configured to enable a first identity management system. In specific embodiments of the invention, in which multiple virtual web server instances are generated in the physical server, each of the multiple virtual web server instances may be configured to enable the second identity management system, or each of the virtual web server instances may be configured to enable different identity management systems (i.e., more than two identity management systems).

At Event 920, an access request is received from a host executing a first distributed application. The access request requests access to a second distributed application. The first distributed application and the second distributed application support either the first identity management system or the second identity management system.

In response to receiving the access request, at Event 930, a first set of rules is intelligently implemented to determine to route the request, within one of the physical servers, to either (i) the pre-existing web server instance that enables the first identity management system, or (ii) one of the virtual web server instances that enable the second identity management system. In specific embodiments of the invention, the first set of rules are configured to analyze the access request, specifically, the header of the access request, for the presence of an authentication token and determine to route the request to either (i) the pre-existing web server instance that enables the first identity management system, or (ii) one of the virtual web server instances that enable the second identity management system based on the presence or lack of presence of the authentication token. In further specific embodiments of the invention, the presence of the authentication token results in routing of the access request to the one of the virtual web server instances that enable the second identity management system, while lack of presence results in routing of the access request to the pre-existing web server instance that enables the first identity management system. In specific embodiments of the invention, the access request is received and the first set of rules are intelligently implemented at a local traffic management gateway/router device or the like.

In alternate embodiments of the method (not shown in FIG. 4) if the implementation of the first set of rules results in a decision to route the access request to one of the one of the virtual web server instances that enable the second identity management system, a healthy/capability check may be undertaken to insure that the virtual web server instance is alive (i.e., capable of processing the access request). In the event that the virtual web server instance is determined to unhealthy/incapable of processing the access request, the access request may be routed to the pre-existing web server instance enabling the first identity management system or another virtual web server instance, that is determined to be healthy/capable, and which enables the second identity management system.

Referring to FIG. 5, a flow diagram is depicted of a method 1000 for managing the simultaneous use of multiple identity management systems in different distributed applications, in accordance with embodiments of the present invention. At Event 1010, a host on which a distributed application is executing sends an access request (e.g., URL or the like) requesting access to a connected, upstream distributed application. The connected upstream distributed application may support the same identity management system or a different identity management system as the distributed application executing on the host.

A computing platform 400, such as a local traffic management apparatus residing at a data center receives the access request and implements a set of rules to determine routing of the access request. According to the embodiment shown in FIG. 5, at Decision 1020, the access request is analyzed, specifically the header of the access request, to determine whether an authentication token is presented in the access request. Presence of an authentication token is indicative of a certain type of identity management system, which relies on the authentication token to propagate authentication credentials from application to application (as opposed to other types of identity management systems that may rely on cookies to propagate authentication credentials from application to application or the like). In response to determining that an authentication is not present in the access request, at Event 1040, the access request is routed to the pre-existing web server instance 510 executing on web server 500 and is processed for access using the first identity management agent.

In response to determining that an authentication token is present in the access request, at Decision 1030, a health check is performed to determine whether the virtual web server 520 instance is alive (i.e., functional). If the virtual web server instance is determined to not be alive/healthy, at Event 1050, the access request is routed to the pre-existing web server instance executing on web server 500 and is processed for access using the first identity management agent. If the virtual web server instance is determined to be alive/healthy, at Event 1040, the access request is routed to the virtual web server instance 520 executing on web server 500 and processed for access using the second identity management agent. At Event 1060, in response to either processing the access request by the first identity management agent or the second identity management agent, the user is provided access to the distributed application executing on application server 800.

Thus, as described in detail above, present embodiments of the invention include systems, methods, computer program products and/or the like for generating dynamic security queries for knowledge-based authentication based on historical records. In this regard, once a user has a need to authenticate (e.g., gain access to an application or service or perform a function requiring authentication), a historical dataset associated with the user is retrieved from a historical datastore. Dynamic security queries and the answers are then determined from the historical dataset and presented to the user. The user will either have first-hand knowledge of the answers to the queries or be able to readily search within user-specific datastores to find the answers to the queries. The dynamic nature of the queries and answers means that once generated, the queries and the answers are exclusively stored in temporary memory (i.e., Random Access Memory (RAM) or the like). This means that the questions and answers are permanently erased from memory after they have been presented to the user or, at a maximum, are erased from memory once the computing session is terminated. Thus, since the queries/answers are determined from dynamic user-specific datasets compiled at the time of authentication, the present invention is able to generate knowledge-based queries that are not capable of identification by other parties from any level of personal record searching.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for managing multiple identity management systems across a plurality of distributed applications, the system comprising;
   a plurality of distributed applications, each distributed application configured to support either (i) a first identity management system configured to control user access, or (ii) a second identity management system, each of the first and second identity management systems are configured to control user access to a corresponding one of the plurality of distributed applications;
   one or more servers, each server comprising a web server instance configured to enable the first identity management system within one or more of the distributed applications and at least one virtual web server instance configured to enable the second identity management system within the one or more of the distributed applications;
   a computing platform including a memory and at least one processing device in communication with the memory, wherein the memory stores instructions that are executable by the at least one processing device and configured to:
      receive a request, originating from a first one of the plurality of distributed applications, to access a second one of the plurality of distributed,
      in response to receiving the request, implement a first set of rules to analyze the request to determine whether the request includes an authentication token storing user authentication credentials, wherein the inclusion of the authentication token in the request indicates that the authentication token is used to propagate user authentication credentials from the first distributed application to the second distributed application, and route the request to either (i) the web server instance enabling the first identity management system based on determination that the request does not include the authentication token, or (ii) one of the at least one virtual web server instances enabling the second identity management system based on determination that the request does include the authentication token, wherein the routing of the request to either (i) or (ii) provides for the request to be processed without requiring a user of the first and second distributed applications to re-enter login-credentials.

2. The system of claim 1, wherein the first and second identity management systems are configured to allow for users to access the plurality of distributed applications while only providing login credentials at an initially accessed one of the plurality of distributed applications.

3. The system of claim 1, wherein the instructions are further configured to, in response to determining to route the request to (ii) the one of the at least one virtual server instances, determine a capability of the one of the at least one virtual web server instances to enable the second identity management system within the second one of the distributed applications, wherein determining the capability of the one of the at least one virtual web server instances includes verifying that the one of the at least one virtual web server instances is operational and responsive to requests.

4. The system of claim 3, wherein the instructions are further configured to, in response to determining that the one of the at least one virtual web server instances is incapable of enabling the second identity management system within the second one of the distributed applications, route the request to (i) the web server instance enabling the first identity management system.

5. The system of claim 1, wherein the instructions are further configured to implement a second set of rules to determine the one of the one or more servers to route the request to.

6. The system of claim 5, wherein the instructions configured to implement the second set of rules to determine the one of the one or more servers to route the request to are further configured to determine the one of the one or more servers based on current processing loads at the one or more servers.

7. A computer-implemented method for managing multiple identity management systems across a plurality of distributed applications, the method executable by one or more processing devices and comprising;

generating, within one or more servers having a web server instance configured to enable a first identity management system within one or more of a plurality of distributed applications, at least one virtual web server instance configured to enable a second identity management system within the one or more of the plurality of distributed applications, wherein each of the first and second identity management systems are configured to control user access to a corresponding one of the plurality of distributed applications;

receiving a request, originating from a first one of the plurality of distributed applications, to access a second one of the plurality of distributed applications; and in response to receiving the request, implementing a first set of rules to analyze the request to determine whether the request includes an authentication token storing user authentication credentials, wherein the inclusion of the authentication token in the request indicates that the authentication token is used to propagate user authentication credentials from the first distributed application to the second distributed application; and route the request, within one of the one or more servers, to either (i) the web server instance enabling the first identity management system based on determination that the request does not include the authentication token, or (ii) one of the at least one virtual web server instances enabling the second identity management system based on determination that the request does include the authentication token, wherein the routing of the request to either (i) or (ii) provides for the request to be processed without requiring a user of the first and second distributed applications to re-enter login-credentials.

8. The computer-implemented method of claim 7, wherein receiving the request further comprises receiving the request, wherein the request is configured to allow a user to access the second one of the plurality distribution applications absent the user providing login credentials.

9. The computer-implemented method of claim 7, further comprising, in response to determining to route the request to (ii) the one of the at least one virtual server instances, determining a capability of the one of the at least one virtual web server instances to enable the second identity management system within the second one of the distributed applications, wherein determining the capability of the one of the at least one virtual web server instances includes verifying that the one of the at least one virtual web server instances is operational and responsive to requests.

10. The computer-implemented method of claim 9, further comprising, in response to determining that the one of the at least one virtual web server instances is incapable of enabling the second identity management system within the second one of the distributed applications, routing the request to (i) the web server instance enabling the first identity management system.

11. The computer-implemented method of claim 7, further comprising implementing a second set of rules to determine the one of the one or more servers to route the request to based on current processing loads at the one or more servers.

12. A computer program product including a non-transitory computer-readable medium, the non-transitory computer-readable medium comprising:

a first set of codes for causing a computer to generate, within one or more servers having a web server instance configured to enable a first identity management system within one or more of a plurality of distributed applications, at least one virtual web server instance configured to enable a second identity management system within the one or more of the plurality of distributed applications;

a second set of codes for causing a computer to receive a request, originating from a first one of the plurality of distributed applications, to access a second one of the plurality of distributed applications; and a third set of codes for causing a computer to, in response to receiving the request, implement a first set of rules to analyze the request to determine whether the request includes an authentication token storing user authentication credentials, wherein the inclusion of the authentication token in the request indicates that the authentication token is used to propagate user authentication credentials from the first distributed application to the second distributed application; and a fourth set of codes for causing a computer to route the request, within one of the one or more servers, to either (i) the web server instance enabling the first identity management system based on determination that the request does not include the authentication token, or (ii) one of the at least one virtual web server instances enabling the second identity management system based on determination that the request does include the authentication token, wherein the routing of the request to either (i) or (ii) provides for the request to be processed without requiring a user of the first and second distributed applications to re-enter login-credentials.

13. The computer program product of claim 12, wherein the second set of codes are further configured to cause the computer to receive the request, wherein the request is configured to allow a user to access the second one of the plurality distribution applications absent the user providing login credentials.

14. The computer program product of claim 12, further comprising a fifth set of codes for causing a computer to, in response to determining to route the request to (ii) the one of the at least one virtual server instances, determine a capability of the one of the at least one virtual web server instances to enable the second identity management system within the second one of the distributed applications, wherein determining the capability of the one of the at least one virtual web server instances includes verifying that the one of the at least one virtual web server instances is operational and responsive to requests.

15. The computer program product of claim 14, further comprising a sixth set of codes for causing a computer to, in response to determining that the one of the at least one virtual web server instances is incapable of enabling the second identity management system within the second one of the distributed applications, route the request to (i) the web server instance enabling the first identity management system.

16. The computer program product of claim 12, further comprising a fifth set of codes for causing a computer to implement a second set of rules to determine the one of the one or more servers to route the request to based on current processing loads at the one or more servers.

* * * * *